United States Patent [19]

Yu

[11] Patent Number: 5,085,080
[45] Date of Patent: Feb. 4, 1992

[54] TEMPERATURE AND PRESSURE MEASURING TECHNIQUE USING THE PHOTOACOUSTIC EFFECT AND MECHANICAL RESONANCE

[75] Inventor: Chang Yu, Boise, Id.

[73] Assignee: Micron Technology, Inc., Boise, Id.

[21] Appl. No.: 593,835

[22] Filed: Oct. 5, 1990

[51] Int. Cl.$^5$ ...................... G01N 29/12; G01H 13/00
[52] U.S. Cl. ......................................... 73/579; 73/657; 73/862.59
[58] Field of Search .................. 73/579, 643, 657, 653, 73/655, 862.59, 800, 702; 356/358, 345; 374/117

[56] References Cited

U.S. PATENT DOCUMENTS

| | | | |
|---|---|---|---|
| 3,726,129 | 4/1973 | Thorne | 73/579 |
| 4,379,226 | 4/1983 | Sichling et al. | 73/653 |
| 4,448,525 | 5/1984 | Mikoshiba et al. | 73/607 |
| 4,468,136 | 8/1984 | Murphy et al. | 374/45 |
| 4,521,118 | 6/1985 | Rosencwaig | 374/5 |
| 4,529,319 | 7/1985 | Müller | 356/432 |
| 4,557,607 | 12/1985 | Busse | 374/121 |
| 4,655,608 | 4/1987 | Goss et al. | 374/119 |
| 4,683,750 | 8/1987 | Kino et al. | 73/606 |
| 4,713,540 | 12/1987 | Gilby et al. | 73/862.59 |
| 4,724,314 | 2/1988 | Caimi | 250/205 |
| 4,806,760 | 2/1989 | McGlade | 250/330 |

FOREIGN PATENT DOCUMENTS 2636744 3/1990 France .............................. 73/702

OTHER PUBLICATIONS

"Infrared-Laser Interferometric Thermometry: A Nonintrusive Technique for Measuring Semiconductor Wafer Temperatures", by V. M. Donnelly and J. A. MCaulley (J. Vac. Sci. Technol.) A 8(1) Jan./Feb. 1990.
"Contribution to the Interferometric Measurement of Sub-Angstrom Vibrations", by Th. Kwaaitaal (Rev. Sci. Instrum., vol. 45, No. 1) Jan. 1974, pp. 39-41.

Primary Examiner—Hezron E. Williams
Assistant Examiner—Rose M. Finley
Attorney, Agent, or Firm—Stanley N. Protigal

[57] ABSTRACT

A method of measuring the temperature of a sample or alternately, the pressure surrounding a sample, consists of using the photoacoustic effect to measure the resonant frequency of the sample. By measuring the resonant frequency of an object, which varies with changes in the temperature of the sample and the pressure surrounding the sample, a greater signal-to-noise ratio is achieved, thereby increasing the accuracy and robustness of the disclosed method over previous methods of measurement using the photoacoustic effect. To determine the desired parameter, the resulting resonant frequency is compared to values on like samples (or on the sample itself) under known environmental conditions.

6 Claims, 4 Drawing Sheets

TEMPERATURE AND PRESSURE MEASURING TECHNIQUE USING THE PHOTOACOUSTIC EFFECT AND MECHANICAL RESONANCE

FIELD OF THE INVENTION

This invention relates to a method for accurately measuring the temperature of an object using the photoacoustic effect and the amplified measurement signal at resonance. In addition, this method can be used to measure the pressure surrounding an object. The method described is ideally suited for measuring the temperature of an object, or the pressure surrounding an object, in a production environment.

BACKGROUND OF THE INVENTION

Methods of quick and accurate, non-contact parametric measurements have been increasingly important in recent years, especially with the demands of high-volume semiconductor manufacture. As the technology required to manufacture the intricate designs of today's semiconductors has been pushed to its limits, maintaining environmental conditions has become essential for maintaining yields and producing reliable product. Even small changes in the production environment, including such parameters as humidity, temperature, pressure, and particulate count at a crucial time can significantly affect product yield and reliability.

While strict environmental control is crucial during the manufacture of semiconductors, there is a great emphasis on production volume as well. Higher volumes translate into lower unit cost. Speed and accuracy are often at odds, and finding the most profitable balance can be of utmost importance in maintaining a viable, cost-competitive product. As volumes of current generation chips produced by a typical manufacturing plant approach several million per month, slicing fractions of a second off per unit manufacturing times can increase total throughput significantly. In an ideal situation, two or more production steps can be accomplished in parallel.

These high volumes also mean that a small percentage increase in product yield, such as might be found with more accurate control of environmental conditions, greatly increases the number of functioning units. Finding measurement techniques which are better suited for a production environment, which can be used in parallel with other production steps, assists in attaining this goal.

Various problems exist with present methods of temperature measurement. Many steps of the wafer fabrication process, such as plasma etch and ion deposition, are incompatible with many commonly used temperature measurement techniques and prevent them from being used in situ.

Pyrometry has been used with some success in the manufacture of semiconductor wafers. The calibration technique (heating a sample with a known melting temperature until it liquifies and setting the temperature output by the pyrometer according to that temperature), however, is difficult, tedious, and fairly inaccurate. It has been estimated that in some systems, errors of up to 100° C. can occur.

Measuring the temperature using a thermocouple, although a fairly accurate method, is impractical for a high-volume wafer manufacturing facility as it requires that the thermocouple be welded onto the surface of the wafer.

The literature describes various methods of parametric measurements of a sample object which incorporate the photoacoustic effect. Methods employing the photoacoustic effect typically use a laser beam modulated at a fixed known frequency to set up a periodic heating on the surface of a sample object, such as a semiconductor. The rapid heating and cooling on the surface of the sample causes the surface to expand and contract, thereby setting up a vibration (acoustic wave) within the sample.

In some methods using the photoacoustic effect, the vibration of the sample is measured, for instance with piezoelectric means or a microphone, and the results are compared to a look-up table calibrated from measurements on like samples.

In other methods, an acoustic wave is reflected off a sample vibrated by photoacoustic means. The preperturbated wave frequency is compared to the frequency of the wave after it has reflected off the vibrating sample. The results, as in the first method, are compared to a look-up table calibrated from the measurements on like samples.

The literature describes the measurement of various parameters of an object using the photoacoustic effect including object thickness, density, and structural integrity.

SUMMARY OF THE INVENTION

An object of this invention is to provide a method for measuring the temperature of an object that overcomes various problems associated with previous temperature measurement apparatuses and methods. More specifically, this invention provides a means for measuring the temperature of an object that is accurate, non-intrusive, non-contact, non-destructive, and which will work in a vacuum.

The described method used for measuring the temperature of a sample can also be used to measure the pressure surrounding the sample. The method of determining the pressure using the invention is also disclosed.

This invention uses a modulated laser beam, the frequency of the modulation being variable and selectable. The modulated laser beam is focused on the object, which causes a periodic heating on and below the surface of the sample, at and near the point where the beam strikes the sample. The periodic heating and cooling of the surface region of the sample in proximity of the impinging beam causes the area to expand and contract, which sets up a vibration within the sample. The frequency of the vibration of the sample object corresponds to the modulation frequency of the laser beam. The vibrational amplitude is a function of the modulation frequency. The closer the laser modulation frequency matches one of the object's resonant frequencies, the greater the vibration amplitude.

During the measurement, the sample should be supported using as little physical contact with other objects as possible. Any contact of the sample dampens the vibration, thereby decreasing the effectiveness of the invention. Minimizing the surface area contacted by structures physically supporting the object serves to lessen this unwanted dampening effect.

The resonant frequency of an object is determined by a number of factors, including its material properties and geometry, temperature, and the pressure of the environment surrounding the object. For accurate measurements of temperature, the other parameters should remain stable during the measurement.

Because the resonant frequency of different objects can vary greatly, the range of modulation frequencies required for the measurement is object specific. To determine the range of modulations for a specific object, preliminary calibrations must be made using the invention on the object (or a like object) of interest. During calibration, a sample should be tested at the minimum and maximum temperatures expected, and at enough intermediate points at each temperature to make a determination of the resonant frequency of the object at a given temperature to a desired level of accuracy. FIG. 3, described fully in the detailed description of the preferred embodiment, shows an example of data points and the resulting curves for an object measured at three different temperatures.

If the calibrations from one sample are to be accurate for measurements on different samples, the samples must be similar in material and geometry, and must be located in the same environmental pressure. The closer these parameters correspond between samples, the more accurate the calibration measurements will correspond to other samples. The invention would work best in production environments where samples are uniform, as in the production of semiconductor wafers, or when a single object is to be measured at different times.

For the measurement, the modulation frequency is initially set at the starting level determined from prior experimentation. The modulated beam is focused on the sample object. The modulated laser beam incident on the surface of the object sets up a periodic heating at and near the surface of the object, which in turn causes the surface of the object to expand and contract at and around the proximity of where the beam strikes it. This rapid expansion and contraction of the sample sets up a vibration within the sample, and the amplitude of the vibration is measured and stored. The frequency of the laser beam modulation is changed to the next level, which changes the frequency and the amplitude of the vibration of the sample. The vibration amplitude of the second measurement is stored. The vibration amplitude is measured over the remaining range of predetermined laser modulation frequencies. The frequency at which the maximum vibration amplitude occurs corresponds to the resonant frequency of the sample.

This invention can also be used to measure the environmental pressure surrounding the object. The same calibration on the sample is completed, except instead of keeping the pressure surrounding the object constant and varying the temperature, measurements at different pressures are taken while keeping the temperature of the sample stable. This is the only change required to measure the environmental pressure surrounding an object using the described invention.

For most accurate temperature measurements, it is advisable to keep the sample object in a vacuum. Measuring the sample in a vacuum allows greater control over other external parameters which would, if uncontrolled, change the resonant vibration frequency of the sample and contaminate the temperature measurement. Performing the measurements in a vacuum also minimizes the dampening effect due to air resistance, and serves to maximize the photoacoustic signal.

One improvement of this invention over previous measurement means is that keying in on the resonant vibration of a sample increases the accuracy of the measurement by improving the signal-to-noise ratio. Due to the low conversion efficiency from optical energy into acoustical energy, the photoacoustic signal is usually relatively weak. At the sample resonance, however, the photoacoustic signal, in the form of a sample vibration, is significantly amplified. This amplification is equal to the quality factor of the sample. At resonance, only the signal coherent with the laser modulation frequency is amplified and the noise incoherent with the laser modulation frequency is effectively reduced relative to the desired signal.

DETAILED DESCRIPTION OF THE PREFERRED EMBODIMENT

Figure 1:
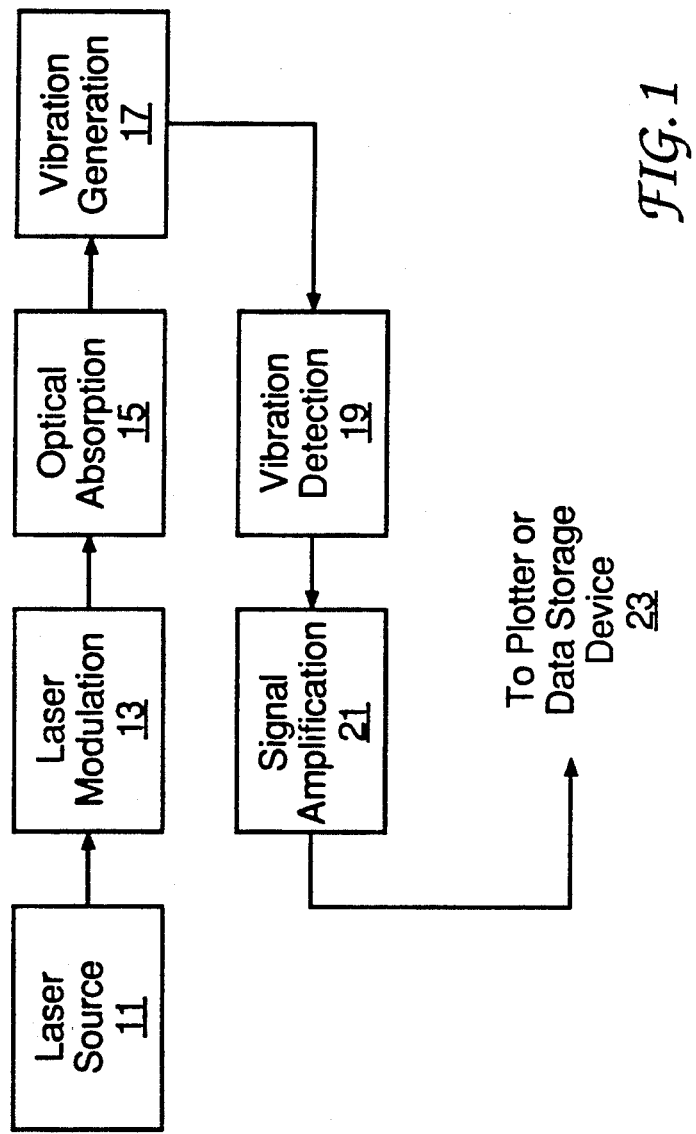
FIG. 1 shows a block diagram of the photoacoustic effect.

FIG. 1 is a block diagram describing the photoacoustic effect employed in the invention. Block 11 represents a laser source. The laser beam is modulated 13, and focused on the object of interest. The object absorbs the energy 15 from the beam, and a periodic heating and cooling is set up on and near the surface of the object in the region of the impinging laser beam. This periodic heating and cooling causes the area around the impinging beam to expand and contract, thereby setting up a vibration within the sample 17. This vibration is detected 19, and the signal is amplified 21. Frequencies other than the modulation frequency are filtered out, and desired calculations or plots 23 are performed on the results.

Figure 2:
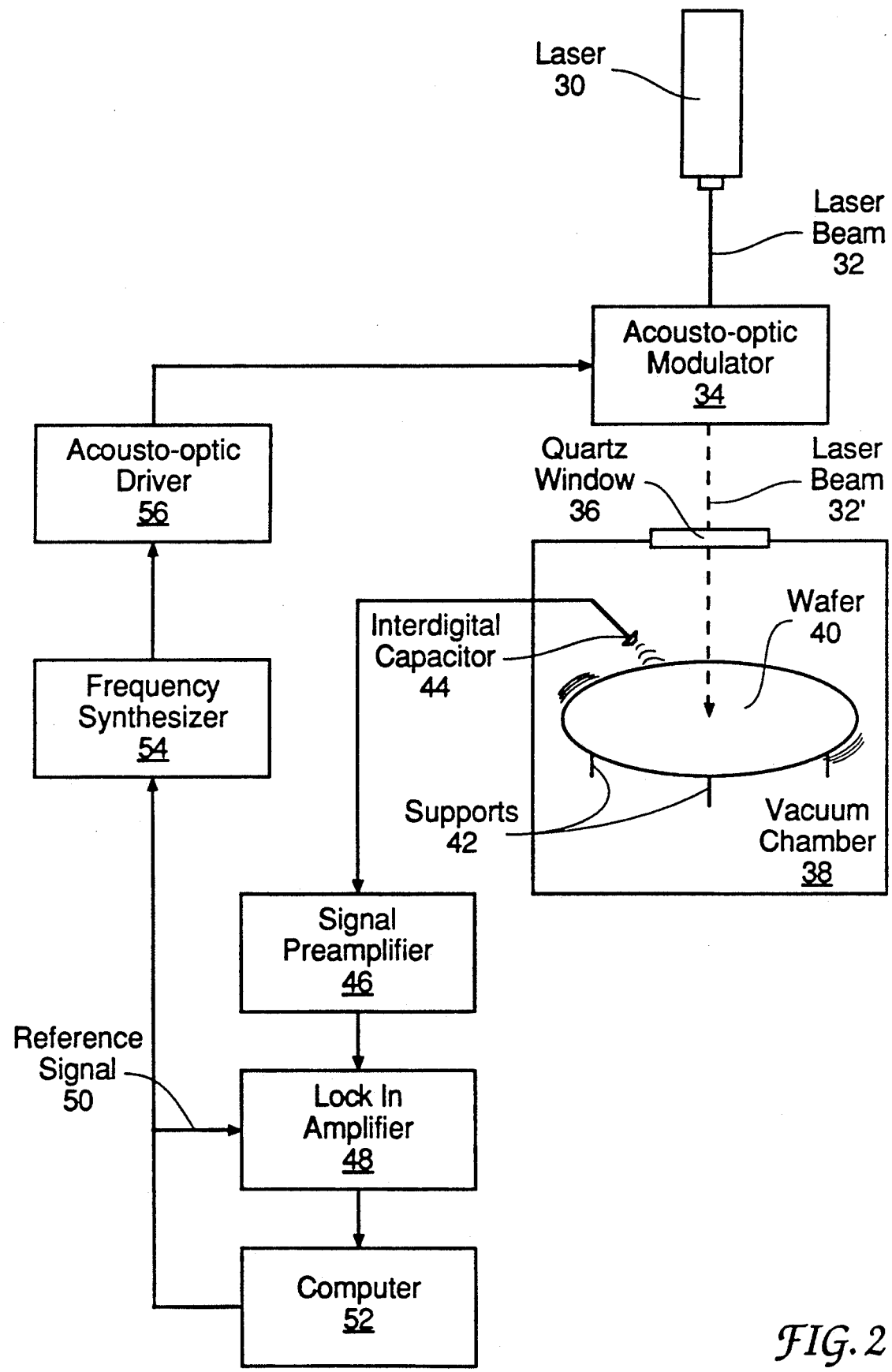
FIG. 2 shows the elements comprising one possible physical embodiment of the invention.

FIG. 2 shows one possible physical embodiment incorporating the invention. A laser beam 32 output by a laser 30 is modulated at a starting frequency. This starting frequency is previously set by the researcher and output to the modulator 34 by a computer 52. The modulated beam 32' passes into a vacuum chamber 38 through a quartz window 36 and is focused onto the sample object 40, in this case a semiconductor wafer. The wafer is supported by three supports 42 which contact the object minimally. The amplitude of the vibration of the sample resulting from the photoacoustic effect is detected by a sensor 44, such as an interdigital capacitor or by interferometry, and transferred to a signal preamplifier 46 which boosts the signal. The amplified signal is then sent to a lock-in amplifier 48 which uses the reference signal 50 from the computer 52 to filter out the noise. The lock-in amplifier then sends the vibration amplitude to the computer 52 where it is stored. The computer 52 sends the next modulation frequency to the frequency synthesizer 54. The frequency synthesizer 54 generates the signal and sends the signal to the acousto-optic driver 56 which drives the acousto-optic modulator 34. The signal continues to the acousto-optic modulator 34. The modulator 34 modulates the laser beam at the new frequency, and the vibration amplitude of the sample is again measured. The process continues until the vibration amplitude of the sample has been measured over the range of frequency values. The frequency at which the maximum vibration amplitude occurs (the resonant vibration) is determined and compared to a table of previously calibrated values on like samples (or the object itself) using the described invention. The temperature of the current sample is extrapolated from this process.

Figure 3:
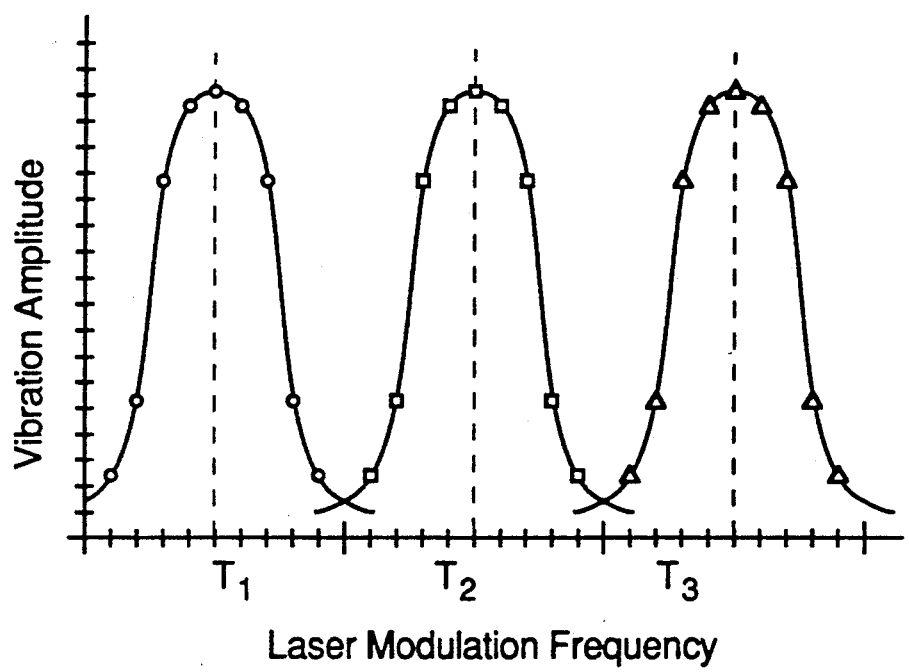
FIG. 3 shows theoretical results of measurements of a sample at three different temperatures, $T_1$, $T_2$, and $T_3$.

FIG. 3 shows sample data which might be found with this measurement means. The modulation frequency is shown along the ordinate in arbitrary units, usually in Khz or Mhz. The actual modulation frequency will depend on the sample and environmental parameters surrounding the sample. The vibration amplitude of the sample resulting from the photoacoustic effect is shown along the abscissa. The vibration amplitude is measured by a vibration-sensitive transducer such as an interdigital capacitor or an interferometer. $T_1$, $T_2$, and $T_3$ represent three different temperatures at which a sample is measured. Data points for measurements at $T_1$ are shown as round, $T_2$ data points are shown as triangles, and $T_3$ data points are square. Note that in actual measurements, there will usually be a larger number of data points required for each temperature measurement.

Before the measurement, a range of modulation frequencies is determined by measuring a sample object over the expected range of temperatures.

This measurement technique, since it is non-contact, can be used in situ during many manufacturing process steps. In the manufacture of dynamic random access memories, for example, a temperature measurement could be taken during rapid thermal annealing or during sputtering. While a greater control of the temperature of the wafer during these annealing and sputtering steps is known to improve the outcome of this process, temperature is not normally monitored due to the negative effect of previous wafer temperature measurement techniques. More uniform results can be obtained by using the invention to measure the temperature of the wafer during these steps.

Note that for most accurate readings, the sample is placed in a vacuum chamber to control variables such as humidity and pressure. These parameters, if allowed to fluctuate freely, would lessen the accuracy of the invention. The vacuum chamber may not be necessary, depending on the desired accuracy of the measurements. Conditions are fairly accurately controlled in some production and scientific environments, and the vacuum chamber may also not be necessary in these types of settings. Also, placing the samples in a vacuum chamber might not be practical from a logistical viewpoint in some situations.

INTERDIGITAL CAPACITOR TRANSDUCER

A photoacoustic signal is usually a weak signal, due to the low efficiency of conversion from optical energy into acoustical energy, and requires a very sensitive transducer for signal detection. Both contact and non-contact transductions have been used in photoacoustic experiments. For the reasons previously specified, a non-contact method of measurement is necessary for high volume wafer production. One method of measuring the vibration amplitude of the sample in the invention is an interdigital capacitor.

Figure 4:
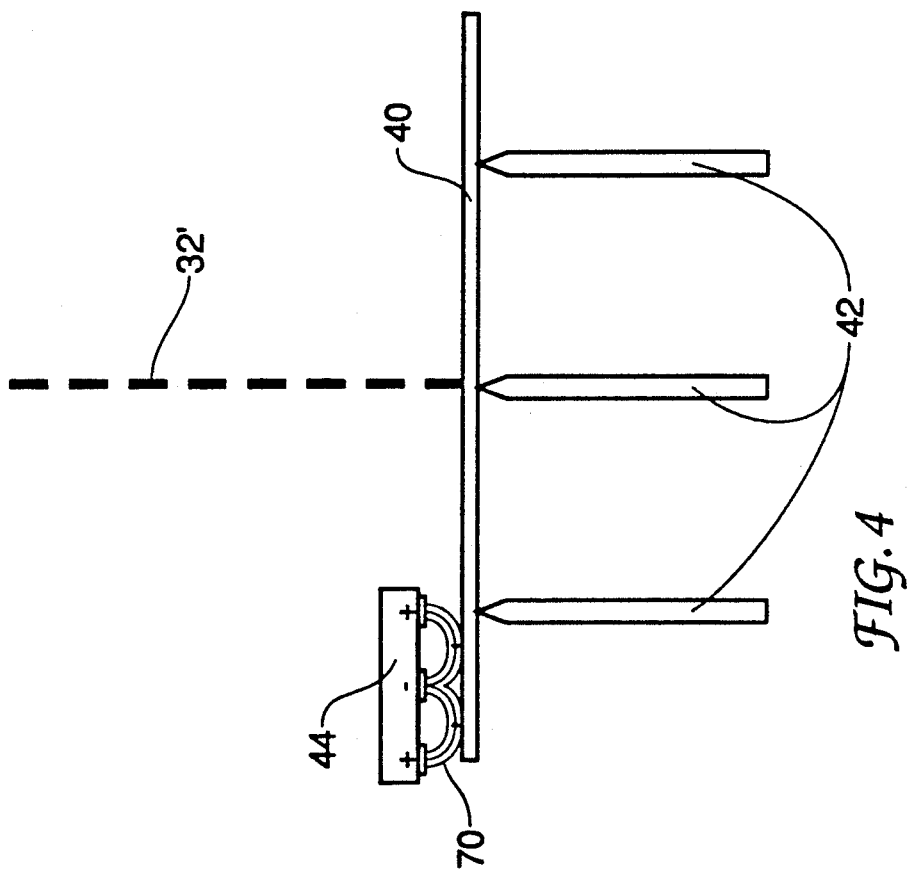
FIG. 4 shows an interdigital capacitor transducer which can be used to measure the vibration frequency of the sample.

FIG. 4 shows the use of an interdigital capacitor transducer 44 to measure the resonant frequency of the sample, in this case a semiconductor wafer 40. The use of an interdigital capacitor 44 to measure the vibration amplitude of the wafer 40 employs the electromagnetic field surrounding the capacitor 70. The wafer 40, vibrated by the impinging modulated laser beam 32', is placed in close proximity to the capacitor 44, close enough to measurably disturb the electromagnetic field surrounding the capacitor 70. As the wafer vibrates, it alters the voltage potential across the cell plates of the capacitor (not shown), the extent and period of the voltage fluctuations being directly proportional to the vibration amplitude of the wafer. The voltage across the electrodes of the capacitor is related to the capacitance of the capacitor in the equation $V=QC$, where V is the voltage across the cell plates, Q is the charge stored in the capacitor, and C is the capacitance. C is a function of the dielectric constant of the medium between the positive and negative electrodes. When the interdigital capacitor 44 is placed very close to the sample 40, the dielectric constant of the sample 40 also contributes to the capacitance of the interdigital capacitor, due to the fringing effect. Since the contribution to the capacitance by the sample dielectric is a function of the distance between the capacitor 44 and sample surface, the vibrating sample surface will result in a varying interdigital capacitor capacitance, and therefore a varying voltage. By using means previously described, the vibration amplitude of the wafer 40 can be determined.

This method of measuring the vibration of a sample resulting from the photoacoustic effect not only overcomes the problem of unwanted background signals from scattered laser light confounding the measurements, as can be found with interferometric measurements, it also eliminates the problem of energy loss and signal degradation resulting from sensor attachment in piezoelectric measurement means.

EXAMPLE

The invention described is used to measure the temperature of a silicon wafer. Each wafer measured has a diameter of 15 cm, and is 0.6–0.8 mm thick. The laser beam is produced using a ~1 watt continuous wave argon laser. The collimated laser beam has a diameter of ~1 mm, and modulation frequencies will range from 10 Khz to 1 Mhz, with the mean resonant frequency being 100 Khz. The laser beam is modulated using an electro-optical modulator, but any accurate modulator, such as an acousto-optical modulator, would be sufficient. The sample is encased in a vacuum chamber during the measurement, and is supported from the underneath side by three supports.

The vibration amplitude is measured using an interdigital capacitor, but measurement using a laser interferometry technique, or any other non-contact measurement technique, would be adequate.

The lock-in amplifier used in this embodiment of the invention is one such as model 124 available from Princeton Applied Research Co. or a similar device, many of which are known to those skilled in the art.

The computer used to generate the frequencies and store the vibration amplitudes is an IBM AT, running an internally produced program. A program which runs through the range of selected values, stores the returned vibration frequency, and determines the sample-specific resonant frequency would be easily written by one skilled in the art.

The frequency synthesizer which generates the modulation frequency and sends it to the modulator is a Hewlett-Packard model 332313, or a similar device.

What has been described is just one possible physical embodiment incorporating the invention. Clearly, variations to the described design, and entirely different designs using other components, could employ the invention. Substitute components, and other methods of accomplishing the various tasks necessary to put the invention into practice, are well known to those of ordinary skill in the art.

I claim:

1. A method of measuring a physical aspect of an object using a laser source and an interdigital capacitor, comprising:
   a) focusing a modulated laser beam on the object;
   b) measuring the resulting vibration amplitude of the object with said interdigital capacitor;
   c) determining the resonant frequency of the object by adjusting the modulation frequency of said laser beam until said resulting vibration amplitude of the object is maximized; and
   d) comparing said resonant frequency to known resonant frequencies calibrated from similar objects with respect to said physical aspect, thereby obtaining a measurement of said physical aspect.

2. A method of measuring a physical aspect of an object, as recited in claim 1, wherein said laser source is a continuous wave laser.

3. A method of measuring a physical aspect of an object, as recited in claim 1 or 2 wherein the physical aspect measured is the temperature.

4. A method of measuring an environmental parameter surrounding an object using a laser source and an interdigital capacitor, comprising:
   a) focusing a modulated laser beam on the object;
   b) measuring the resulting vibration amplitude of the object;
   c) determining the resonant frequency of the object by adjusting the modulation frequency of said laser beam until said resulting vibration amplitude of the object is maximized; and
   d) comparing said resonant frequency to known resonant frequencies calibrated from known environmental parameters from similar objects, thereby obtaining a measurement of said environmental parameter.

5. A method of measuring an environmental parameter surrounding an object, as recited in claim 4, wherein said laser source is a continuous wave laser.

6. A method of measuring an environmental parameter surrounding an object, as recited in claim 4 or 5, wherein the environmental parameter measured is the pressure.

* * * * *